United States Patent [19]

Kühl et al.

[11] Patent Number: 4,714,484

[45] Date of Patent: Dec. 22, 1987

[54] VENTILATING DEVICE

[75] Inventors: Hans-Dieter Kühl, Mundelsheim; Hans-Dieter Schmidt, Remseck, both of Fed. Rep. of Germany

[73] Assignee: Deutsche Vortex GmbH, Monchen-Gladbach, Fed. Rep. of Germany

[21] Appl. No.: 858,395

[22] Filed: May 1, 1986

[30] Foreign Application Priority Data

May 3, 1985 [DE] Fed. Rep. of Germany ....... 3515936

[51] Int. Cl.$^4$ .............................................. B01D 19/00
[52] U.S. Cl. ...................................... 55/170; 55/465; 55/411; 55/160
[58] Field of Search ................... 55/159, 55, 165, 160, 55/166, 170, 199, 411, 465

[56] References Cited

U.S. PATENT DOCUMENTS 2,037,245  4/1936  Leifheit et al. ...................... 55/166
2,713,973  7/1955  Hencken et al. ...................... 55/199
3,344,587  10/1967  Wakeman .............................. 55/170

FOREIGN PATENT DOCUMENTS

25388  11/1930  Australia ................................ 55/170

Primary Examiner—Bernard Nozick
Attorney, Agent, or Firm—Herbert L. Lerner; Laurence A. Greenberg

[57] ABSTRACT

A ventilating device for a gas-carrying flowing fluid medium, includes a gas collecting chamber having an open bottom, a housing below the collecting chamber, and a tube disposed substantially horizontally in the housing below the gas collecting chamber for conducting the medium and reducing the velocity of the medium, the tube defining a space surrounding the tube in the housing, and the tube having a wall with lateral openings formed therein permitting gas bubbles to rise through the wall openings into the space and from the space into the gas collecting chamber.

11 Claims, 7 Drawing Figures

VENTILATING DEVICE

The invention relates to a ventilating device for a gas-carrying flowing fluid medium, including a gas collecting chamber which is open toward the bottom and preferably can be automatically vented. Such devices which are known in the art are not particularly effective.

It is accordingly an object of the invention to provide a ventilating device which overcomes the hereinaforementioned disadvantages of the heretofore-known devices of this general type and which works especially effectively.

With the foregoing and other objects in view there is provided, in accordance with the invention, a ventilating device for a gas-carrying or gas-laden flowing fluid medium, comprising a gas collecting chamber having an open bottom, a housing of the ventilating device below the collecting chamber, and a tube disposed substantially horizontally in the housing below the gas collecting chamber for conducting the medium and reducing the velocity of the medium, the tube defining a space surrounding the tube in the housing, and the tube having a wall with lateral openings formed therein permitting gas bubbles to rise through the wall openings into the space and from the space into the gas collecting chamber.

In accordance with another feature of the invention, there are provided means disposed in the gas collecting chamber for automatically venting the gas collecting chamber. The accumulated gas can be discharged from time to time, either manually or by the automatic means, such as by some sort of conventional float valve configuration.

In accordance with a further feature of the invention, the tube is a diffuser. In this way the formation of the gas bubbles is enhanced.

In accordance with an added feature of the invention, the tube has an end, and including an impact surface disposed in front or downstream of the end of the tube, as seen in flow direction. For example, this impact area can be formed by the wall of the housing. This impact area also facilitates the formation of the gas bubbles.

In accordance with an additional feature of the invention, the wall openings are elongated or longitudinal slots. Elongated or longitudinal slots have definite advantages, as will be explained below.

In accordance with again another feature of the invention, the space surrounding the tube conducts the medium in a counterflow from an upstream or inlet side receiving medium from the end of the tube to a downstream or outlet side feeding medium to the wall openings, the space having a larger flow cross section than the tube, at least at the downstream side thereof.

In accordance with again a further feature of the invention, the space surrounding the tube or diffuser is a ring diffuser. This configuration is provided without special effort if the central tube forms a diffuser and the housing of the ventilating device is cylindrical. The advantages of the inner diffuser also apply to the outer diffuser.

In accordance with again an added feature of the invention, there is provided a region with a narrowed cross section disposed between the tube or diffuser and the space surrounding the tube in flow direction of the medium for increasing flow velocity of the medium. For example, the narrowed section may be positioned between the edge of the tube or diffuser and the impact surface or area.

In accordance with again an additional feature of the invention, the narrowed cross section is disposed at the upstream or inlet side of the space or ring diffuser surrounding the tube. This is a most advantageous structure. For Example, the inlet side of the ring diffuser can have a considerably smaller flow cross section than the outlet side of the inner diffuser.

In accordance with yet another feature of the invention, there is provided an impact wall disposed at the downstream side of the space or diffuser surrounding the tube or diffuser. This impact surface also serves for aiding the formation of gas bubbles and the confluence of smaller gas bubbles to form larger gas bubbles, so that the ventilation becomes more effective.

In accordance with yet a further feature of the invention, the impact wall closes off the space surrounding the tube and has at least one opening for the medium formed in a lower region thereof being positioned so as to be traversed by gas bubbles against the resistance of forces causing the bubbles to rise. While gas bubbles migrate upward, the medium flows downward with a lesser flow velocity to reach the outlet opening.

In accordance with yet an added feature of the invention, there is provided an inlet element and an outlet element for the medium and means for varying the position of the inlet and outlet elements relative to the housing of the ventilating device. This is done in order to give the ventilating device according to the invention the capability of being applicable to all kinds of pipe installations and hydraulic systems. This makes it possible to let the medium flow in and out in any chosen direction, while always maintaining the gas collection chamber in the desired position above the gas separating means.

In accordance with still another feature of the invention, the housing has upstream and downstream sides, or inlet and outlet sides, a sealing rim formed on the housing, and a ring space formed in the housing at the downstream side thereof, the tube being concentrically disposed in the housing at the upstream side thereof, the inlet and outlet elements have a common housing having a sealing rim mating with the sealing rim of the first-mentioned housing, the inlet element being concentrically fitted to the tube, the outlet element being aligned with the ring space, and the position varying means being a connection element interconnecting the sealing rims of the housings for selectively varying angular orientations of the housings for given requirements.

In accordance with a concomitant feature of the invention, the tube has an inlet or upstream side being freely rotatable in a bore formed in the common housing of the inlet and outlet elements and a front edge sealed against the common housing.

Other features which are considered as characteristic for the invention are set forth in the appended claims.

Although the invention is illustrated and described herein as embodied in a ventilating device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Referring now to the figures of the drawing in detail and first, particularly, to FIGS. 1 and 2 thereof, there is seen a ventilating device which is designated as a whole with reference numeral 1 and which includes a diffuser or tube 3 which is disposed substantially horizontally below a gas collecting chamber 5 and is provided with wall openings in its upper region in the form of three longitudinal or elongated slots 2. The wall openings or slots 2 are dimensioned in such a way that gas bubbles 27 can rise through these wall openings 2 upwardly into a space 15 which surrounds the diffuser 3, and can rise from there into the gas collecting chamber 5, as shown in FIG. 2.

Figure 2:
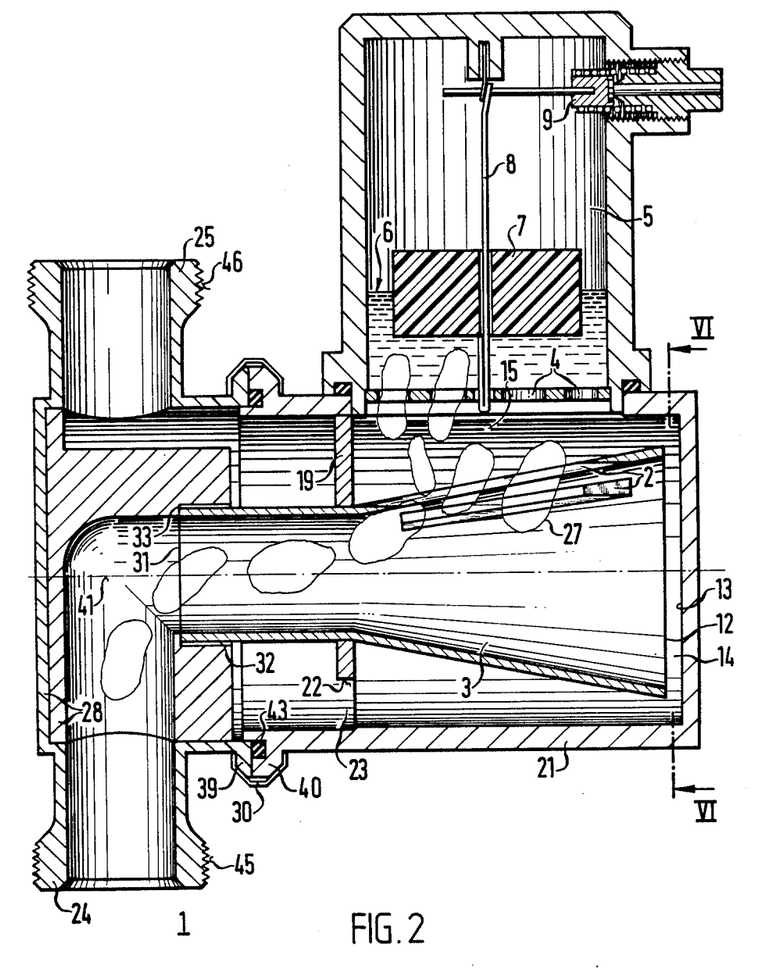
FIG. 2 is a cross-sectional view of the ventilating device, taken along the line II—II in FIG. 1, in the direction of the arrows.

The larger gas bubbles which are shown in FIG. 2, can flow into the diffuser 3 with the flowing medium. However, they can also be generated in the diffuser 3 because the flow velocity decreases in the diffuser. The gas bubbles 27 flow into the gas collecting chamber 5 through openings 4 formed in the bottom of the gas collecting chamber, and the gas is collected in the chamber 5 above a fluid level 6. The gas collecting chamber 5 has a float 7 disposed therein which opens a valve 9 by pulling a linkage or rod 8, when the fluid level 6 has dropped as far as is shown in FIG. 2. The valve 9 opens due to the fact that the float 7 has moved down along the linkage 8 and begins to apply a load to the linkage 8 causing a closure element of the valve 9 to be lifted from its seat.

Figure 3:
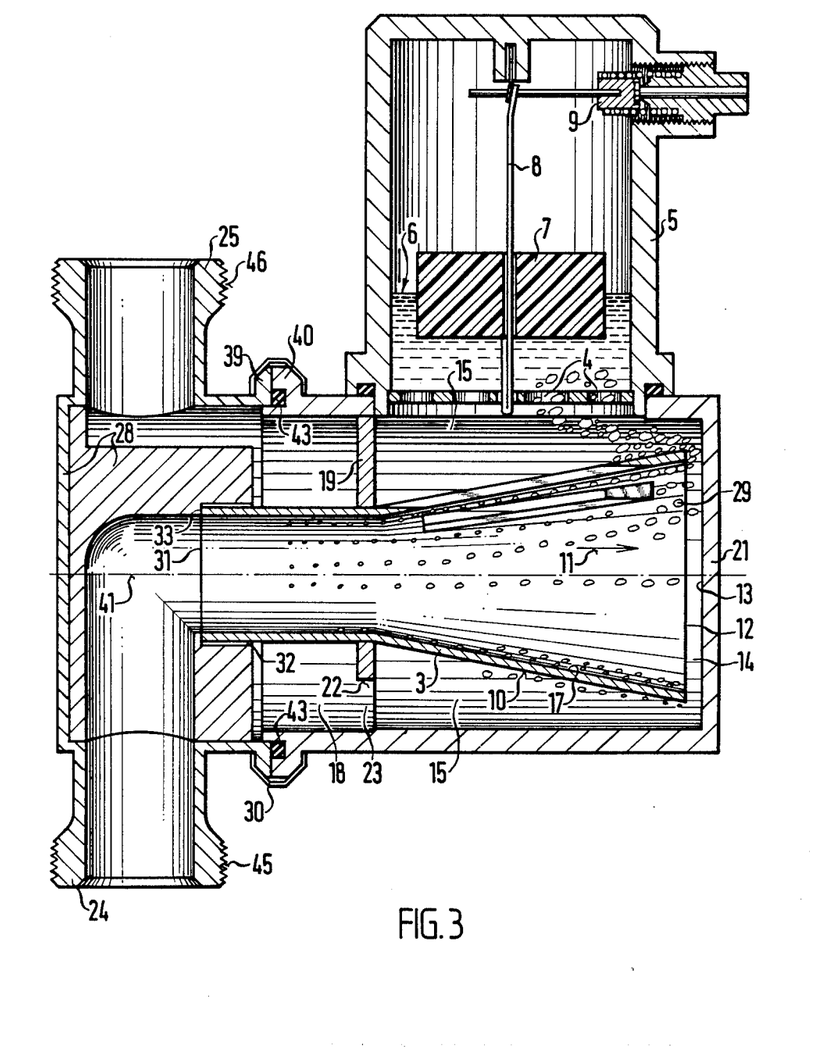
FIGS. 3, 4 and 5 show the same cross section as in FIG. 2, with different bubble formations.

If the gas-carrying liquid medium flows through the diffuser 3 in the direction of an arrow 11 according to FIG. 3, micro-bubbles attach themselves to the inner wall surface 17 of the diffuser 3, due to the interruption of the flow, and these small bubbles slowly accumulate forming larger bubbles 29 which migrate in the direction toward an end 12 of the diffuser. The housing 21 of the ventilating device 1 forms an impact area 13 in front of the end 12 of the diffuser. An annular gap 14 which is formed between the diffuser end 12 and the impact area or surface 13 increases the flow velocity, so that the accumulated air bubbles are carried along into the adjacent space 15, which surrounds the diffuser 3 and forms a ring diffuser. In this ring diffuser 15 the flow velocity is reduced again, so that the accumulated micro-bubbles have time to migrate through the openings 4 into the gas collecting chamber 5, as indicated in FIG. 3.

Figure 4:
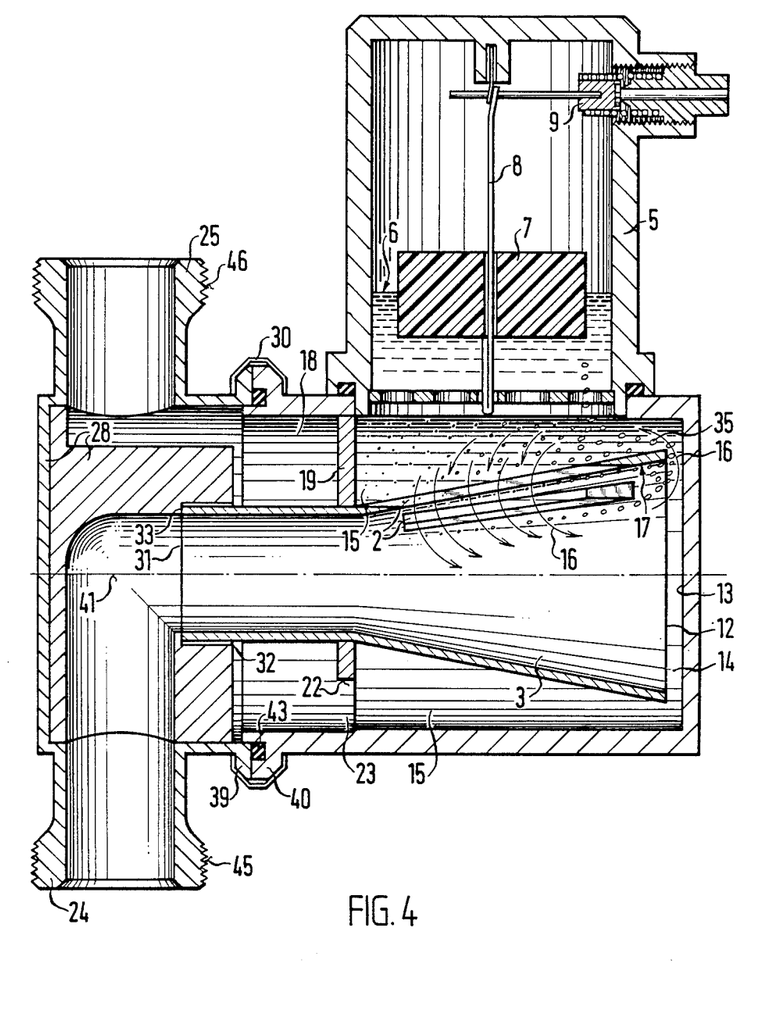

FIG. 4 shows that these micro-bubbles 35 which do not have enough upward momentum to travel into the gas collecting chamber, are conducted back into the diffuser 3 through the slots 2, due to a circulating flow 16 which is caused by the pressure differences between the diffuser 3 and the ring diffuser 15. In the diffuser 3 these small bubbles can again form bigger bubbles, perhaps at the inner wall surface 17 of the diffuser 3, and these bigger bubbles can finally reach the gas collecting chamber 5 after being recycled.

The ring diffuser 15 which surrounds the diffuser 3 has an impact wall 19 at the downstream end thereof. The impact wall 19 closes off the ring diffuser 15 at the downstream end. The impact wall 19 is provided at a lower region 22 thereof with an opening 23 for the flow of the medium. The position of the opening 23 is chosen in such a way that it can only be traversed by gas bubbles against the resistance of the force which makes the bubbles rise.

Figure 5:
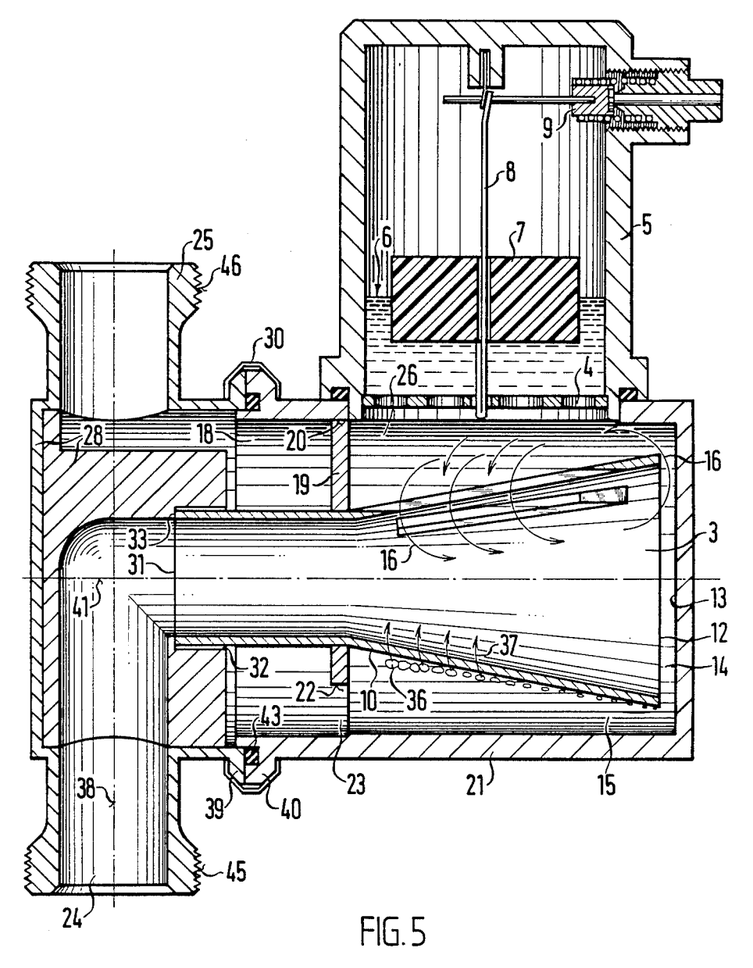
Figure 6:
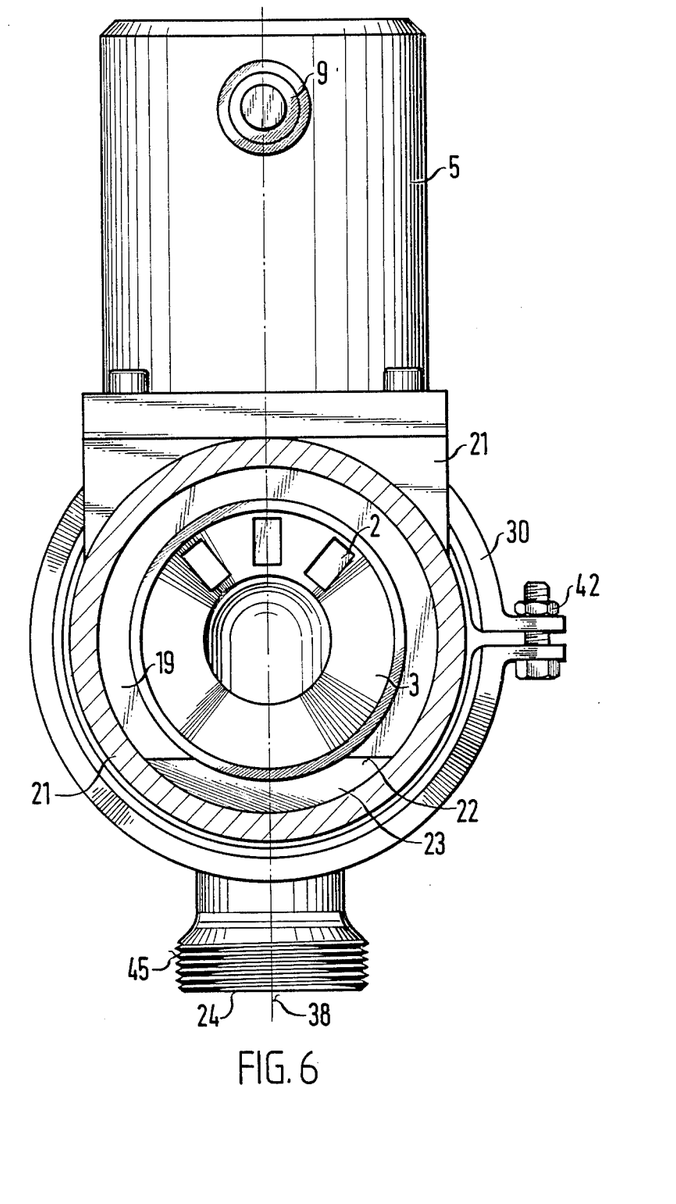
FIG. 6 is a cross-sectional view of the ventilating device, taken along the line VI—VI in FIG. 2, in the direction of the arrows.

As shown in FIG. 5, the periphery 20 of the impact wall 19 forms a gas-tight seal with the cylindrical housing 21. The free or open cross section of the opening 23 corresponds with the cross section of an inlet element 24 and the cross section of an outlet element 25, for continuity reasons. The impact wall 19 prevents gas bubbles which have already risen, from travelling from a region 26 into a ring space 18 which is disposed upstream of the impact wall 19. Since there is no flow oriented in the direction toward the opening 23, micro-bubbles held back in the region 26 are caught by the circulating flow 16 and are conducted back into the diffuser 3. In the diffuser 3 they accumulate to form larger bubbles, until they also finally reach the gas collecting chamber 5.

As shown in FIG. 3 and FIG. 5, due to the reduced flow velocity in the ring diffuser 15, micro-bubbles also collect on the outer wall surface 10 of the diffuser 3, accumulate to form larger bubbles 36 and rise upward around the diffuser 3 in the direction of an arrow 37, as shown in FIG. 5, so that they reach the gas collecting chamber 5 through the openings 4.

Another objective of the invention is to make the ventilating device 1 as universally applicable as possible. This means that it should be possible to install it into pipelines or hydraulic plants and systems of all kinds, without requiring special measures to be taken with respect to the direction of flow at the installation site. For this purpose, it is provided that the inlet element 24 and the outlet element 25 are disposed in such a way that their position or orientation with respect to the housing 21 of the ventilating device 1 can be varied.

For practical reasons, the inlet element 24 and the outlet element 25 lie behind each other in the direction of the axis 38. The inlet element 24 and the outlet element 25 have a common housing 28. The housing 28 has an annular sealing edge or rim 39 which fits on a likewise annular edge or rim 40 of the housing 21 of the ventilating device 1. The sealing rim 40 of the housing 21 surrounds the ring space 18 at the outlet side.

The diffuser 3 is disposed concentrically along an axis 41. The inlet element 24 is concentrically fitted to the centrally disposed diffuser 3, as shown in FIG. 5, for example. The outlet element 25 is adjacent the ring space 18. The sealing edges or rims 39, 40 of the two housings 28, 21 are connected with each other by a connection element having provisions for variable angular orientations, which can be chosen to suit the particular requirements.

Figure 1:
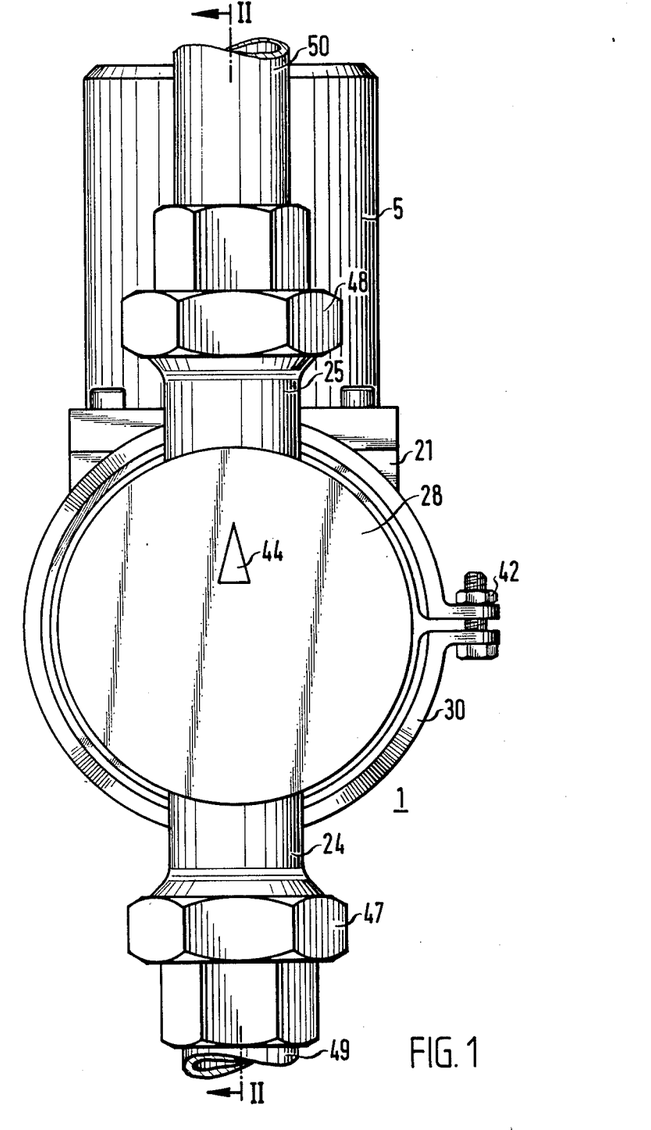
FIG. 1 is a fragmentary, diagrammatic, front-elevational view of the ventilating device according to the invention.

The connection element is formed of a clamp 30 with a V-shaped profile, which is pressed against the sealing rims 39, 40 by a screw connection 42, shown in FIG. 1. An inserted sealing ring 43 guarantees a reliable seal.

Figure 7:
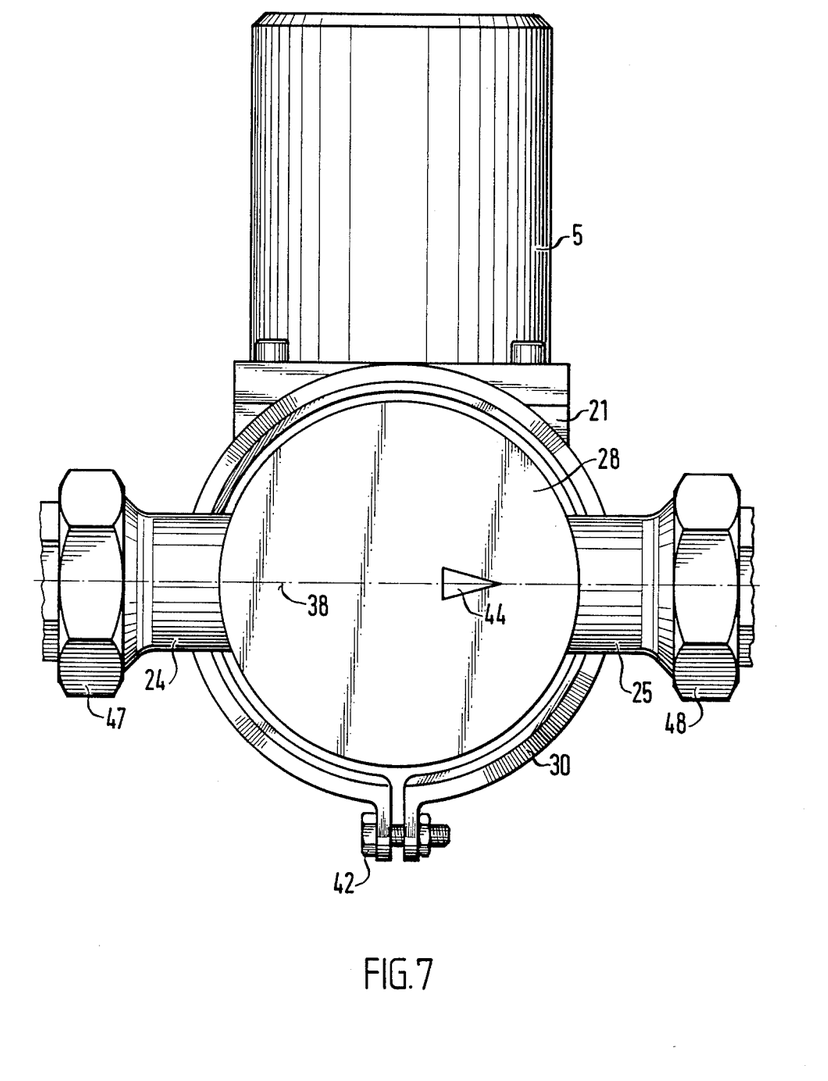
FIG. 7 is another front-elevational view of the ventilating device shown in FIG. 1, with the inlet and outlet elements rotated through 90 degrees.

After releasing the screw connection 42, the sealing rims 39, 40 can be moved relative to each other so that, for example, the housing 28 can be moved with respect to the housing 21 from the position shown in FIG. 1 to the position shown in FIG. 7, which simultaneously moves an arrow 44 indicating the flow direction, through 90 degrees. The screw connection 42 is then tightened again. In the illustrated embodiment, the inlet element 24 has an outer thread 45 and the outlet element 25 has an outer thread 46. These threads mate with pipe threads or respective collars 47, 48, through which the ventilating device 1 is attached to pipes 49, 50, as shown in FIG. 1.

The housing 28 has a bore 32 formed therein, in which an inlet end 31 of the diffuser 3 is freely rotatable. The diffuser 3 has a front end surface 33 which is sealed against the housing 28.

We claim:

1. Ventilating device for a gas-carrying flowing liquid medium, comprising a gas collecting chamber having an open bottom, a housing disposed below and connected to said collecting chamber, an inlet element connected to said housing, a tube in the form of a diffuser having an end and being disposed substantially horizontally in said housing below said gas collecting chamber for conducting the medium from said inlet element and reducing the velocity of the medium, said tube defining a space surrounding said tube in said housing, and said tube having a wall with lateral openings formed therein permitting gas bubbles to rise through said wall openings into said space and from said space into said gas collecting chamber, an impact surface disposed in front of said end of said tube as seen in flow direction, means in the form of a relatively narrow passage between said impact surface and said end of said tube for increasing the velocity of the medium and an outlet element connected to said housing for the liquid downstream of said space.

2. Ventilating device according to claim 1, including means disposed in said gas collecting chamber for automatically venting said gas collecting chamber.

3. Ventilating device according to claim 1, wherein said wall openings are elongated slots.

4. Ventilating device according to claim 1, wherein said narrow passage is disposed at said upstream side of said space surrounding said tube.

5. Ventilating device according to claim 1, wherein said tube and said housing, defining said space surrounding said tube include means for conducting the medium in a counterflow from an upstream side of said space receiving medium from said end of said tube to a downstream side of said space feeding medium to said wall openings, said space having a larger flow cross section than said tube, at least at said downstream side thereof.

6. Ventilating device according to claim 6, wherein said tube and said housing defining said space surrounding said tube form a ring diffuser.

7. Ventilating device according to claim 5, including an impact wall disposed at said downstream side of said space surrounding said tube.

8. Ventilating device according to claim 7, wherein said impact wall closes off said space surrounding said tube and has at least one opening for the medium formed in a lower region thereof being traversed by gas bubbles against the resistance forces causing the bubbles to rise.

9. Ventilating device according to claim 1 including means for varying the position of said inlet and outlet elements relative to said housing.

10. Ventilating device according to claim 9, wherein said housing has upstream and downstream sides, a sealing rim formed on said housing, and a ring space formed in said housing at said downstream side thereof, said tube being concentrically disposed in said housing at said upstream side thereof, said inlet and outlet elements have a common housing connected to said first-mentioned housing having a sealing rim mating with said sealing rim of said first-mentioned housing, said inlet element being concentrically fitted to said tube, said outlet element being aligned with said ring space, and said position varying means being a connection element interconnecting said sealing rims of said housings for selectively varying angular orientations of said housings for given requirements.

11. Ventilating device according to claim 10, wherein said tube has an inlet being freely rotatable in a bore formed in said common housing of said inlet and outlet elements and a front edge sealed against said common housing.

* * * * *